US008373669B2

(12) United States Patent
Miernik

(10) Patent No.: US 8,373,669 B2
(45) Date of Patent: Feb. 12, 2013

(54) GRADUAL PROXIMITY TOUCH SCREEN

(75) Inventor: Jerzy Miernik, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 12/506,489

(22) Filed: Jul. 21, 2009

(65) Prior Publication Data
US 2011/0018811 A1 Jan. 27, 2011

(51) Int. Cl.
G06F 3/041 (2006.01)
(52) U.S. Cl. ......................... 345/173; 345/169
(58) Field of Classification Search .................. 345/168, 345/169, 173–175, 619; 715/863
See application file for complete search history.

(56) References Cited

U.S. PATENT DOCUMENTS

| 5,936,623 | A | 8/1999 | Amro | |
|---|---|---|---|---|
| 2002/0180763 | A1 | 12/2002 | Kung | |
| 2006/0022955 | A1* | 2/2006 | Kennedy | 345/173 |
| 2006/0161871 | A1* | 7/2006 | Hotelling et al. | 715/863 |
| 2008/0024454 | A1 | 1/2008 | Everest | |
| 2008/0098331 | A1 | 4/2008 | Novick | |
| 2008/0252616 | A1 | 10/2008 | Chen | |
| 2009/0058829 | A1* | 3/2009 | Kim et al. | 345/173 |
| 2009/0058830 | A1 | 3/2009 | Herz | |
| 2009/0174677 | A1 | 7/2009 | Gehani | |
| 2009/0256814 | A1* | 10/2009 | Chung et al. | 345/173 |
| 2009/0323586 | A1* | 12/2009 | Hohl et al. | 370/328 |
| 2010/0259500 | A1* | 10/2010 | Kennedy | 345/173 |
| 2010/0295821 | A1* | 11/2010 | Chang et al. | 345/175 |
| 2010/0321321 | A1* | 12/2010 | Shenfield et al. | 345/173 |
| 2010/0328351 | A1* | 12/2010 | Tan | 345/661 |

FOREIGN PATENT DOCUMENTS

| EP | 0684543 A1 | 11/1995 |
|---|---|---|
| EP | 1615109 A2 | 1/2006 |
| EP | 1942401 A1 | 7/2008 |
| EP | 2000896 A2 | 12/2008 |
| WO | WO 2006/013485 A2 | 2/2006 |

OTHER PUBLICATIONS

International Search Authority Invitation to Pay Additional Fees including Communication Relating to the Results of the Partial International Search dated Nov. 24, 2010.

* cited by examiner

Primary Examiner — Ricardo L Osorio
(74) Attorney, Agent, or Firm — Tucker Ellis LLP

(57) ABSTRACT

In an example embodiment, there is disclosed herein an apparatus comprising a touch screen display, a sensing mechanism operable to sense an object in proximity of the touch screen display, and control logic coupled to the sensing mechanism and the touch screen display. The control logic is operable to calculate an anticipated touch point for the object on the touch screen. The control logic is responsive to calculating the anticipated touch point to increase a size of a portion of the touch screen display around the anticipated touch point.

22 Claims, 3 Drawing Sheets

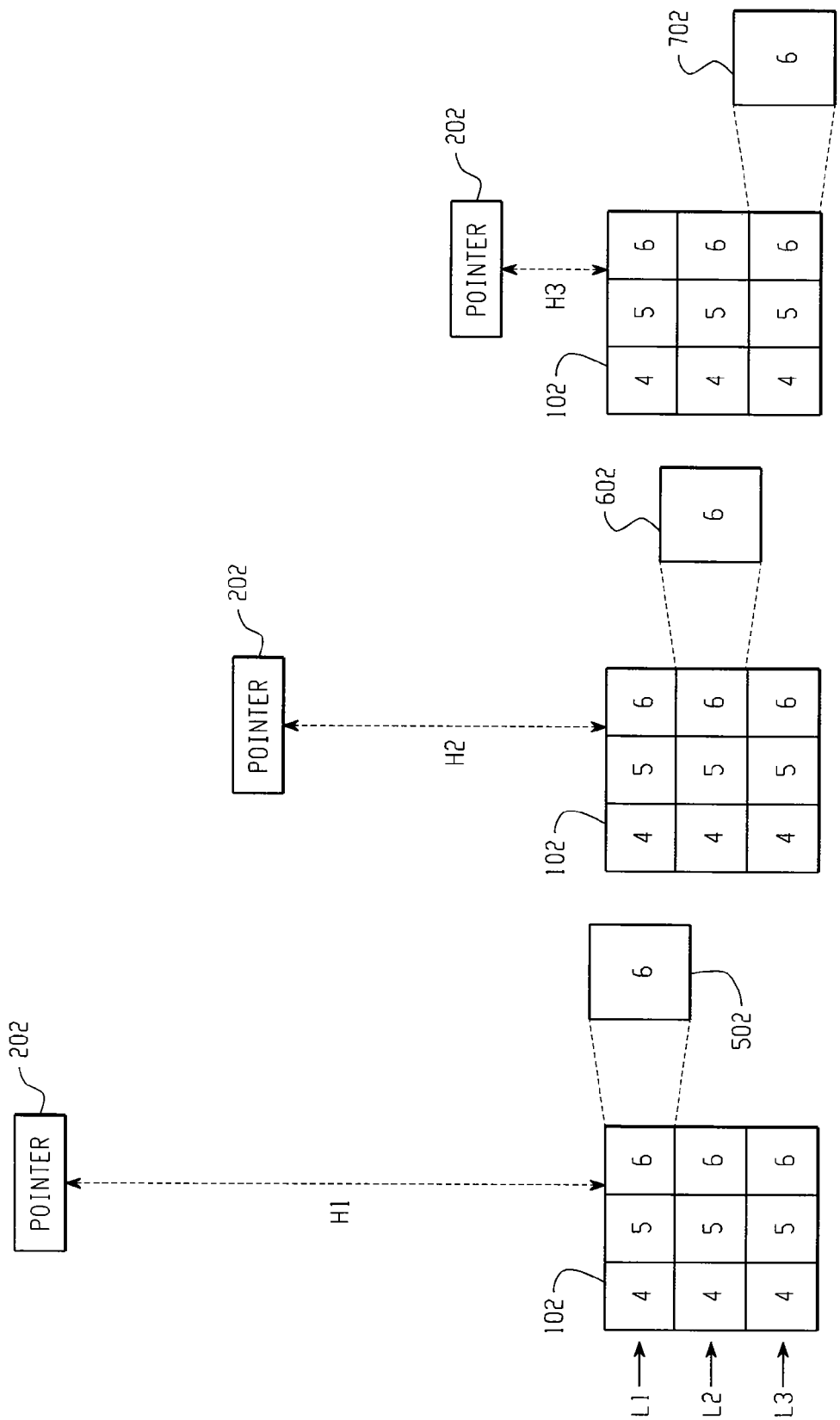

GRADUAL PROXIMITY TOUCH SCREEN

TECHNICAL FIELD

The present disclosure relates generally to data input devices; more specifically, to touch screen devices.

BACKGROUND

A touch screen is a display that can detect the presence and location of a touch within the display area. The term generally refers to touch or contact with the display of the device by a finger or hand. Touch screens can also sense other passive objects, such as a stylus. A main attribute of a touch screen is that it enables a user to interact with what is displayed directly on the screen, where it is displayed, rather than indirectly with a mouse or touchpad. Such displays can be attached to computers or, as terminals, to networks. They also play a prominent role in the design of digital appliances such as the personal digital assistant (PDA), satellite navigation devices, mobile phones, and video games, etc.

BRIEF DESCRIPTION OF THE DRAWINGS

The accompanying drawings incorporated herein and forming a part of the specification illustrate the example embodiments.

FIG. 5 illustrates an example of a first layer increased in size based on a first height above a touch screen display.

FIG. 6 illustrates an example of a second layer increased in size based on a second height above a touch screen display.

FIG. 7 illustrates an example of a third layer increased in size based on a third height above a touch screen display.

OVERVIEW OF EXAMPLE EMBODIMENTS

Figure 1:
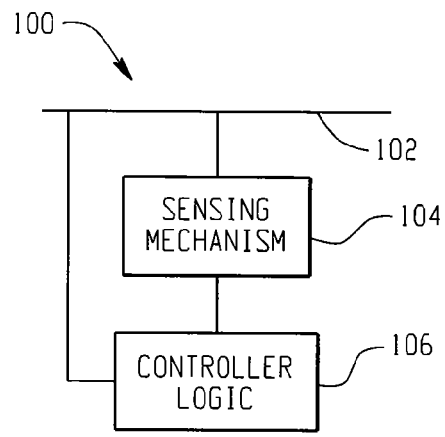
FIG. 1 is a schematic view of a touch screen display in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a touch screen display, a sensing mechanism operable to sense an object in proximity of the touch screen display, and control logic coupled to the sensing mechanism and the touch screen display. The control logic is operable to calculate an anticipated touch point for the object on the touch screen. The control logic is responsive to calculating the anticipated touch point to increase a size of a portion of the touch screen display around the anticipated touch point.

In accordance with an example embodiment, there is disclosed herein a method comprising detecting an object above a touch screen display. An anticipated touch point is determined for the object on the touch screen display. A portion of the touch screen display surrounding the anticipated touch point is increased responsive to determining the anticipated touch point.

In accordance with an example embodiment, there is disclosed herein an apparatus comprising means for detecting an object in proximity of a touch screen display. The apparatus further comprises means for calculating an anticipated touch point on the touch screen display for the object and means for selectively increasing a portion of the touch screen display surrounding the anticipated touch point.

DESCRIPTION OF EXAMPLE EMBODIMENTS

This description provides examples not intended to limit the scope of the appended claims. The figures generally indicate the features of the examples, where it is to be understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In accordance with an, example embodiment, there is disclosed herein a touch screen configured to perform gradual proximity discovery. The system is configured to discover an approaching pointing device, such as a finger, stylus or any other object in above the touch screen, calculate coordinates of an anticipated touch point on the screen, and scale up that portion of the screen. In particular embodiments, the coordinates are computed for three dimensions "3D."

In an example embodiment, the scaling up is inversely proportional to the distance of the pointing device from the touch screen. For example, the smaller the distance from the touch screen, the more the touch screen is scaled up.

In an example embodiment, the system is also able to assess the size of a pointing device, then scale up an area based on the size of the pointing device. For example, a larger area may be scaled up if pointing is done with a finger, whereas a smaller area is scaled up if pointing is being done with a narrow stylus. The scaling up enlarges not only the pertinent display area but also the touch sensitive area for a sure touch. From end user perspective, enhanced touch screen usage comfort is provided, with a sure and easy touch. This obviates going back and forth and can eliminate the need to touch the touch screen display multiple times. Moreover, the example embodiments described herein can help improve the accuracy of touch screen selection.

In an example embodiment, two video cameras are employed on two sides of the touch screen that make the straight angle. These cameras are installed parallel to the screen to provide x y z coordinates of a pointing device. Each of these two cameras can offer a wide angle (e.g. fisheye, 180 degrees) but can offer relatively narrow height of a field of vision (say up to two inches up from the screen). A Central Processor Unit "CPU" or specialized (such as a Digital Signal Processor "DSP") hardware and related software are employed to process in real time the images captured by the two cameras to identify the volume of the approaching pointing device, to estimate its center point on its side closest to the screen, and to estimate the point on the screen the center may touch. The estimation of the anticipated touch point on the touch screen can be made by projecting the trajectory of the pointing device as it approaches the screen. A computationally simpler estimation would be to determine a point on the screen that is closest to the pointing device's estimated center. This would provide feedback to an end user. In particular embodiments, additional cameras are employed.

In an example embodiment, the area on the screen around the anticipated touch point gets enlarged in proportion to the estimated volume of the pointing device and in inverse proportion to the distance from the anticipated touch point to the center of the pointing device. In particular embodiments, the content on the screen does not move, such as, for example, to follow the movements of the pointing device (e.g. 'dragging').

FIG. 1 is a schematic view of an apparatus 100 comprising a touch screen display 102 in accordance with an example embodiment. A sensing mechanism 104 operable to sense an object in proximity of the touch screen display. The object may be any suitable object for pointing to a point and/or an area on the touch screen display such as a finger, stylus, etc. Control logic 106 is coupled to the sensing mechanism and the touch screen display. "Logic," as used herein, includes but is not limited to hardware, firmware, software, and/or combinations of each to perform a function(s) or an action(s) and/or to cause a function or action from another component. For example, based on a desired application or need, logic may include a software controlled microprocessor, discrete logic such as an application specific integrated circuit (ASIC), a programmable/programmed logic device, a memory device containing instructions or the like, or combinational logic embodied in hardware. Logic may also be fully embodied as software.

Figure 2:
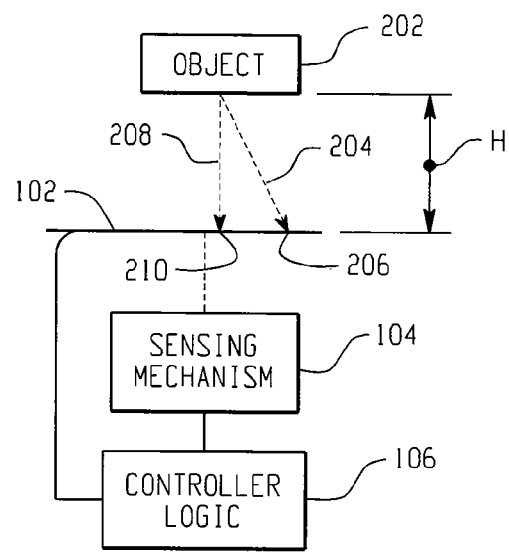
FIG. 2 is a schematic view of a touch screen display illustrating a touch object at a distance from the touch screen display in accordance with an example embodiment.

In an example embodiment, control logic 106 is operable to calculate an anticipated touch point (not shown, see e.g. FIG. 2) for the object on the touch screen display 102. Control logic 106 is responsive to calculating the anticipated touch point to increase a size of a portion of the touch screen display around the anticipated touch point.

Figure 3:
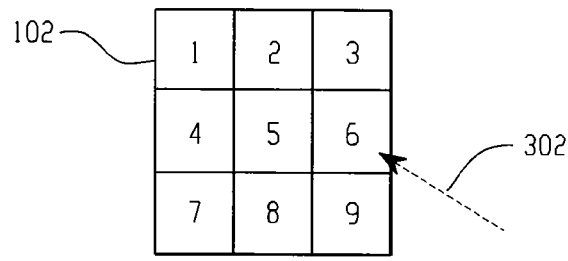
FIG. 3 illustrates an example of using the trajectory of the touch object to determine an anticipated touch point on a touch screen display.
Figure 4A:
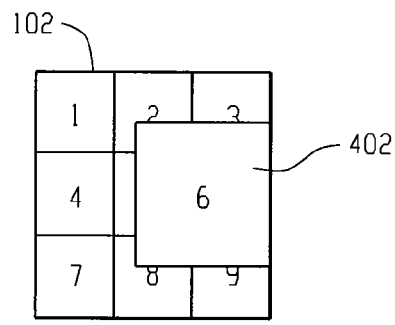
FIGS. 4A and 4B illustrate examples of a portion of a touch screen display increasing in size responsive to determining an anticipated touch point.
Figure 4B:
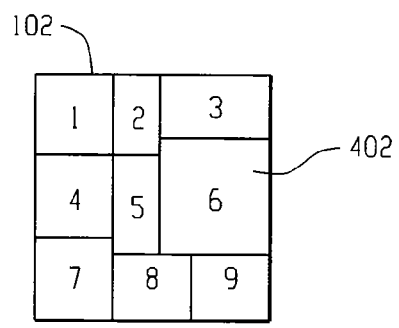

For example, referring to FIGS. 3 and 4 with continued reference to FIG. 1, an example of a touch screen display 102 is illustrated with nine areas numbered 1-9 respectively. Those skilled in the art should readily appreciate that the number of areas illustrated in the example of FIG. 3 was selected merely for ease of illustration, as the touch screen display 102 may have any number of areas of any size, for example from one pixel to any physically realizable number of pixels on the screen. As illustrated by arrow 302, control logic 106 determines that the object is pointing to area 6, which is then enlarged as shown by 402 in FIG. 4. Note in FIG. 4A enlarged area 402 covers the surrounding area while in FIG. 4B the remaining areas of the screen (1, 2, 3, 4, 5, 7, 8, and 9) shrink and/or change shape to remain visible while area 402 is enlarged.

In an example embodiment, control logic 106 is further configured to further change the size of the portion of the touch screen display inversely proportionately to the distance of the object from the touch screen display. For example, control logic 106 may further increase the size of the portion (e.g. 6 in FIG. 4) of the touch screen display responsive to sensing that the object is moving towards the touch screen display. As another example, control logic 106 may decrease the size of the portion (e.g. 6 in FIG. 4) of the touch screen display 102 responsive to sensing that the object is moving away from the touch screen display.

In an example embodiment, control logic 106 is further configured to compute a trajectory of the object. For example, referring to FIG. 2 with continued reference to FIG. 1, control logic 106 determines the trajectory of object 202 as illustrated by 204 and determines the anticipated touch point is at 206. In this example, the area of touch screen display 102 around anticipated touch point 206 would increase in size.

In an example embodiment, control logic 106 determines a point 210 on touch screen display 102 closest to object 202 as illustrated by 208. In this example, the area of touch screen display 102 around anticipated touch point 210 would increase in size.

In an example embodiment, control logic 106 is responsive to determining that the object is moving across the screen to adjust the portion of the screen that is increased to follow movement of the object. For example, referring to FIG. 3 with continued reference to FIGS. 1 and 2, as object 202 moves horizontally across touch screen display 102, area 5 would be enlarged while area 6 returns to normal size, then area 4 would be enlarged while area 5 returns to normal size. In particular embodiments, combinations of area may be increased as object 202 crosses area boundaries. For example, a combination of the right half of area 6 and the left half of area 5 may be enlarged while object 202 is moving horizontally towards the right from area 6 before area 6 is returned to normal size and area 5 is enlarged.

In an example embodiment, the portion of the touch screen display 102 that is increased is proportional to the size of the object. For example, if a finger is in proximity of touch screen display 102, the area that is increased may be larger than if a smaller object such as a stylus is in proximity of touch screen display 102.

In an example embodiment, sensor 104 is a three dimensional sensor. Control logic 106 is configured to determine a distance of the object from the touch screen display 102. For example, a distance or height as illustrated as H in FIG. 2, H1 in FIG. 5, H2 in FIG. 6 and H3 in FIG. 7 is calculated by control logic 106 based on data obtained by sensing mechanism 104. Control logic 106 is configured to generate a display a rendered surface on touch screen display 102 corresponding to the distance of the object from the touch screen display. For example, the entire area of the screen display may be zoomed in based on the distance of the object from touch screen display 102. Once the object is within a predefined distance from touch screen display 102, then the area around the anticipated touch point is increased.

In an example embodiment, control logic 106 may also display a layer on touch screen display 102 based on the distance of the object from touch screen display 102. For example, referring to FIGS. 5-7, there is illustrated a touch screen display 102 displaying a 3D object (such as, for example, a floor plan for a multi-story building) having three layers (L1, L2, L3). Control logic 106 determines that area 6 should be increased, which can be based on object 202's trajectory or position relative to the surface of touch screen display 102. For example, while object 202 is at a first distance from touch screen display, H1, touch screen display 102 increases and displays area 6 of L1 as illustrated by 502. While object 202 is at a second distance from touch screen display, H2, touch screen display 102 increases and displays area 6 of L2 as illustrated by 602. While object 202 is at a third distance from touch screen display, H3, touch screen display 102 increases and displays area 6 of L3 as illustrated by 702.

In an example embodiment, an icon is displayed on touch screen display 102 (for example, the "1" in FIG. 3). Control logic 106 is responsive to detecting that the object is pointing towards the icon to change the size of items displayed on the entire display, as opposed to just an area around the anticipated touch point. This can enable a user to zoom the display without having to tap the touch screen display 102. In particular embodiments, control logic 106 may be responsive to detecting that the object is hovering above a point on the screen to change the size of items displayed on the entire display, as opposed to just an area around the anticipated touch point.

In an example embodiment, sensing mechanism 102 comprises an optical sensor. For example, a plurality of cameras may be mounted at or near the surface of touch screen display 102. Control logic 106 can analyze image data received from the optical sensor or sensors to determine the position of object 202.

In an example embodiment, sensing mechanism 102 comprises an infrared sensor. For example, a plurality of infrared sensors may be mounted at or near the surface of touch screen display 102. Control logic 106 can analyze data received from the infrared sensor or sensors to determine the position of object 202.

In an example embodiment, sensing mechanism 102 comprises a projected capacitance sensor. Control logic 106 can analyze data received from the projected capacitance sensor or sensors to determine the position of object 202.

In an example embodiment, control logic 106 is configured to prevent an item displayed on touch screen display 102 from being dragged while the object 202 is not touching the touch screen display 102. For example, an area of touch screen display 102 is increased responsive to the object 202 moving near touch screen display 102; however, no item on the touch screen display 102 can be moved to another position unless object 202 is actually touching the screen.

Figure 8:
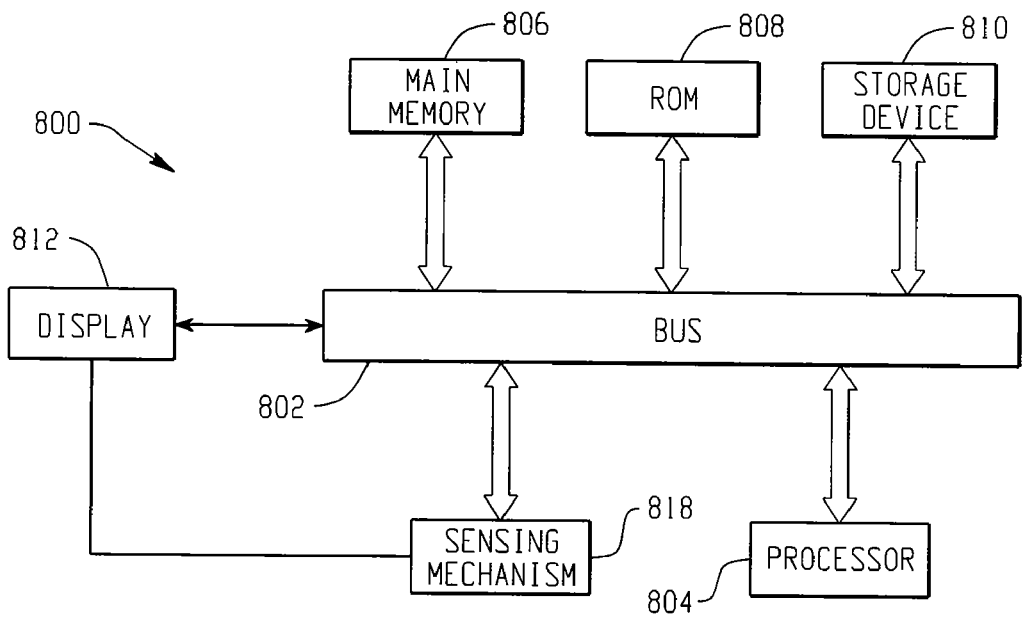
FIG. 8 illustrates a computer system upon which an example embodiment may be implemented.

FIG. 8 illustrates a computer system upon which an example embodiment may be implemented. Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display (such as a touch screen display) 812 such for displaying information to a computer user. A sensing mechanism 818 is coupled to display 812 and is operable to detect objects in proximity (as well as on the surface) of display 812. Sensing mechanism 818 is also coupled to bus 802, enabling processor 804 to obtain data from sensing mechanism 818. Optionally, data from sensing mechanism 818 may be stored in main memory 806 and/or storage device 810.

An aspect of an example embodiment is related to the use of computer system 800 for implementing a gradual proximity touch screen as described herein. According to one embodiment, implementing a gradual proximity touch screen is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to an example embodiment. Thus, the embodiments described herein are not limited to any specific combination of hardware circuitry and software.

The term "computer-readable medium," as used herein, refers to any medium that participates in providing instructions to processor 804 for execution. Such a medium may take many forms, including but not limited to non-volatile media and volatile media. Non-volatile media include, for example, optical or magnetic disks such as storage device 810. Volatile media include dynamic memory such as main memory 806. Common forms of computer-readable media include, for example, a floppy disk, a flexible disk, a hard disk, magnetic cards, paper tape, any other physical medium with patterns of holes, a RAM, a PROM, an EPROM, a FLASHPROM, a CD, a DVD or any other memory chip or cartridge, or any other medium from which a computer can read.

Figure 9:
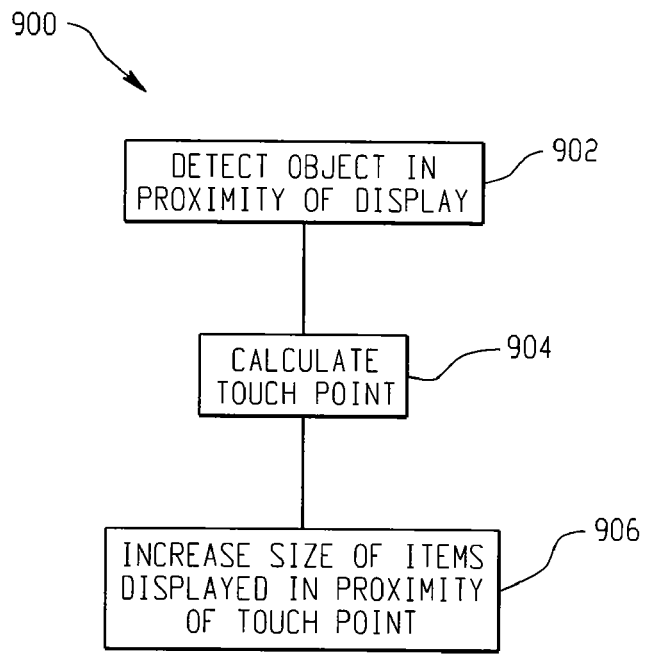
FIG. 9 illustrates an example of a methodology.

In view of the foregoing structural and functional features described above, a methodology in accordance with an example embodiment will be better appreciated with reference to FIG. 9. While, for purposes of simplicity of explanation, the methodology of FIG. 9 is shown and described as executing serially, it is to be understood and appreciated that the example embodiment is not limited by the illustrated order, as some aspects could occur in different orders and/or concurrently with other aspects from those shown and described herein. Moreover, not all illustrated features may be required to implement a methodology in accordance with an aspect of the example embodiment. The methodology described herein is suitably adapted to be implemented in hardware, software, or a combination thereof.

At 902, an object that is in proximity of a touch screen display is detected. The object may be a pointing device such as a stylus, a finger, and/or any other suitable object for use with a touch screen display.

At 904, an anticipated touch point for the object is calculated. In one example embodiment, the trajectory of the object is computed to predict where the object will eventually touch the screen (e.g. the anticipated touch point). In another example embodiment, a point on the touch screen nearest to the object is designated as the anticipated touch point.

At 906, an item or items within a portion of the touch screen display (for example, an area around the anticipated touch point) is/are increased in size. In an example embodiment, the area being enlarged may be changed, increased, and/or decreased responsive to movements of the object. In particular embodiments, the portion of the area being increased (e.g. zoomed in) is inversely proportional to the distance of the object from the touch screen display. For example, the portion of the touch screen display may be further increased responsive to determining that the object is moving closer to the touch screen display. As another example, the portion of the touch screen display may be decreased responsive to determining that the object is moving away from the touch screen display.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
a touch screen display;
a sensing mechanism operable to sense an associated object spaced a distance from the touch screen display; and,
control logic operatively coupled with the sensing mechanism and the touch screen display;
wherein the control logic is operable to calculate an anticipated touch point for the associated object on the touch screen; and,
wherein the control logic is responsive to calculating the anticipated touch point to gradually discover the associated object by scaling a size of a portion of the touch screen display around the anticipated touch point in accordance with the distance, wherein the portion of the touch screen display that is scaled is scaled in accordance with a size of the associated object wherein a relative larger area is scaled in accordance with the associated object being a finger of an associated user of the apparatus and a relative smaller area is scaled in accordance with the associated object being a stylus pointing device.

2. The apparatus set forth in claim 1, wherein the control logic is further configured to increase the size of the portion of the touch screen display responsive to sensing that the associated object is moving towards the touch screen display.

3. The apparatus set forth in claim 1, wherein the control logic is further configured to decrease the size of the portion of the touch screen display responsive to sensing that the associated object is moving away from the touch screen display.

4. The apparatus set forth in claim 1, wherein the control logic is further configured to change the size of the portion of the touch screen display inversely proportionate to the distance of the associated object to the touch screen display.

5. The apparatus set forth in claim 1, wherein:
the control logic is further configured to compute a trajectory of the associated object; and
the control logic is responsive to computing the trajectory of the associated object to determine the anticipated touch point.

6. The apparatus set forth in claim 1, wherein the control logic determines a point on the touch screen closest to the associated object; and
wherein the anticipated touch point is the point on the touch screen closest to the associated object.

7. The apparatus set forth in claim 1, wherein the control logic is responsive to determining that the associated object is moving across the screen to adjust the portion of the screen that is increased to follow movement of the associated object.

8. The apparatus set forth in claim 1, wherein the control logic is operable to scale a size of a first portion of the touch screen display in accordance with the distance of the associated object from the touch screen and to shrink a second portion of the touch screen not part of the first portion to remain visible during the scaling of the first portion.

9. The apparatus set forth in claim 1, wherein:
the sensing mechanism is a three dimensional sensor;
the control logic is configured to determine the distance of the associated object from the touch screen display; and
the control logic is configured to generate a display of a rendered surface on the touch screen display corresponding to the distance of the associated object from the touch screen display.

10. The apparatus set forth in claim 1, wherein:
the control logic is responsive to display an icon on the touch screen display;
the control logic is responsive to detecting the associated object is pointing towards the icon to change a size of items on the entire display.

11. The apparatus set forth in claim 1, wherein the sensing mechanism comprises an optical sensor.

12. The apparatus set forth in claim 1, wherein the sensing mechanism comprises an infrared sensor.

13. The apparatus set forth in claim 1, wherein the sensing mechanism comprises a projected capacitance sensor.

14. The apparatus set forth in claim 1, wherein the control logic is configured to prevent dragging of an item on the touch screen display while the associated object is not touching the touch screen display.

15. A method of gradual discovery of an associated object, the method comprising:
detecting an associated object spaced a distance from a touch screen display;
determining an anticipated touch point on the touch screen display for the associated object; and
enlarging a first portion of the touch screen display surrounding the anticipated touch point proportional to the distance of the associated object relative to the touch screen display, and shrinking a second portion of the touch screen not part of the first portion to remain visible during the enlarging of the first portion.

16. The method according to claim 15, further comprising increasing the portion of the touch screen display responsive to determining that the associated object is moving closer to the touch screen display.

17. The method according to claim 15, further comprising decreasing the portion of the touch screen display responsive to determining that the associated object is moving away from the touch screen display.

18. The method according to claim 15, further comprising computing a trajectory for the associated object; and
wherein the anticipated touch point is based on the trajectory of the associated object.

19. The method according to claim 15, further comprising determining a point on the touch screen display closest to the associated object; and
wherein the point on the touch screen display closest to the associated object is determined to be the anticipated touch point.

20. A gradual proximity discovery apparatus, comprising:
means for detecting an associated object in proximity of a touch screen display;
means for calculating an anticipated touch point on the touch screen display for the associated object; and
means for selectively scaling a portion of the touch screen display surrounding the anticipated touch point in accordance with: i) a distance of the associated object spaced from the touch screen display, and ii) a relative size of the associated object.

21. The apparatus set forth in claim 1, wherein the control logic is responsive to calculating the anticipated touch point to gradually discover the associated object by scaling a size of a touch sensitive area of the touch screen display in accordance with the size of the associated object.

22. The apparatus set forth in claim 8, wherein the control logic is operable to shrink the second portion of the touch screen by shrinking only a first display area of the second portion not part of and immediately adjacent to the first portion of the touch screen.

* * * * *